United States Patent [19]
Thomson

[11] Patent Number: 5,276,874
[45] Date of Patent: Jan. 4, 1994

[54] METHOD FOR CREATING A DIRECTORY TREE IN MAIN MEMORY USING AN INDEX FILE IN SECONDARY MEMORY

[75] Inventor: Robert G. Thomson, Westford, Mass.

[73] Assignee: Digital Equipment Corporation, Maynard, Mass.

[21] Appl. No.: 936,875

[22] Filed: Aug. 27, 1992

Related U.S. Application Data

[63] Continuation of Ser. No. 750,437, Aug. 20, 1991, abandoned, which is a continuation of Ser. No. 393,406, Aug. 11, 1989, abandoned.

[51] Int. Cl.⁵ .............................................. G11C 8/00
[52] U.S. Cl. .......................... 395/600; 364/DIG. 1; 364/222.81; 364/282.3
[58] Field of Search .... 364/DIG. 1; DIG. 2; 395/600

[56] References Cited

U.S. PATENT DOCUMENTS

| | | | |
|---|---|---|---|
| 4,086,628 | 4/1978 | Woodrum | 395/600 |
| 5,008,820 | 4/1991 | Christopher, Jr. et al. | 395/600 |

Primary Examiner—Thomas C. Lee
Assistant Examiner—John C. Loomis
Attorney, Agent, or Firm—Fish & Richardson

[57] ABSTRACT

A digital data processing system having an index file containing a plurality of file headers includes an arrangement having a file header processing portion for iteratively retrieving file headers from an index file and for establishing in response thereto a descriptor defining a directory in a directory tree, each descriptor defining the relationship of the corresponding directory to a parent directory in the directory tree, and a group vector processing portion, responsive to processing of a file header by the file header processing portion, for generating a group vector comprising a plurality of pointers to said descriptors, each pointer defining the relationship of a directory to one or more child directories in said directory tree.

18 Claims, 6 Drawing Sheets

METHOD FOR CREATING A DIRECTORY TREE IN MAIN MEMORY USING AN INDEX FILE IN SECONDARY MEMORY

This is a continuation of application Ser. No. 07/750,437, filed Aug. 20, 1991, now abandoned, which is a continuation of application Ser. No. 07/393,406, filed Aug. 11, 1989, abandoned.

FIELD OF THE INVENTION

The invention relates generally to the field of digital data processing systems, and more specifically to a system and method for extracting the relationships between directories of a volume on a secondary storage device using information stored in an index file on the volume

BACKGROUND OF THE INVENTION

A digital data processing system includes three basic elements, namely, a processor, a memory, and an input/output (I/O) system. The memory stores information in addressable storage locations. This information includes data and instructions for processing the data The processor fetches information from the memory, interprets the information as either an instruction or data, processes the data in accordance with the instructions, and returns the processed data to the memory for storage therein. The I/O system under control of the processor, also communicates with the memory element to transfer information, including instructions and data to be processed, to the memory, and to obtain processed data from the memory. Typically, the I/O system includes a number of diverse types of units, including video display terminals, printers, interfaces to public telecommunications networks, and secondary storage devices, including disk and tape storage devices.

In a digital data processing system as described above which supports a number of users, each user has one or more accounts (also known as user directories) which he uses to store files relating to work on various projects. Some files might be very small, for example, a one page memo in a data file, while others might be very large, for example, a list of several thousand clients in a database application file. The number of files in a large system, one which, for example, supports several thousand users and/or accounts, can be quite large. For example, each account might contain between ten and 100 files. Thus a secondary storage device for the system might easily contain 50,000 to 100,000 separate files which must be managed efficiently to keep response times small and to optimize the use of the storage device. A system for managing such environment is typically organized in the following way, as shown in FIG. 5.

A volume on a secondary storage device, that is, the recording medium for the storage device, for example, a disk pack on a disk drive, contains a number of files of different types including directory files 502, i.e., files which identify other files, and non-directory file 504, for example, data or application files. Typically, these files are organized according to a structure known as a directory tree 500. In addition, structures known as file headers, one for each file, are typically listed in an index file. A description of the directory tree and index file follows.

Generally, a tree refers to a data structure having a number of nodes, each of which contains data and one of which is designated the root node 506. Associated with the root node, e.g., linked via pointer fields, are a number of child nodes of which the root node is the parent. The child nodes of the root can in turn be parents of a further number of child nodes. This parent/child association is referred to as branching. Each branch of the tree can be of a different length and continues these parent/child associations through a number of levels of the tree until reaching a level of the tree in which the nodes have no children, herein referred to as leaf nodes 504.

In the case of a directory tree, the root 506 of the tree represents a master directory file that identifies where on the disk the root directory and any subdirectories begin. The root of the tree is associated with a number of nodes, each of which represents either a directory file 502, for example, a user directory for an account (also referred to as a subdirectory), or a non-directory file 504, for example, a data or application file. Directory paths, that is, branches of the tree, lead from the root directory through user directories and subdirectories to a non-directory file.

Generally, an index file 510 is stored at a known location on the disk and comprises a number of file headers 512. Each file header 512 is a block of information relating to a specific file. The information depends on the particular computer system, but might include, for example, the following: file name, type, location, size, access control data, creation date, and access activity (number of read operations performed on the file, for example). Typically, both the directory tree and the index file are used together to manage directory files and their relationships to one another as described below.

It is known to use both the directory files and index file described above to extract relationships between directories. This is done by traversing each node of the directory tree and opening and examining each directory file represented by a node of the tree. Each time a directory file is opened, the index file is searched to locate the file header for the next directory file in the tree, for example, as is done in the VERIFY, DIRECTORY, and COPY commands of the VMS operating system of Digital Equipment Corporation. It is possible, however, for this approach to take an excessive number of I/O operations, cause the disk head to travel to distant portions of the disk to read a directory file and then back to another portion to read the index file, and also to cause excessive paging operations as portions of the index file are brought in and out of memory for each tree node visited.

Therefore, it is desirable to provide a system and method of extracting the relationships between directories that does not rely on a file by file traversal of the directory tree each time information regarding the relationship between directories is desired.

SUMMARY OF THE INVENTION

In general, the invention is a method useful in a program for a computer that arranges its files in a directory tree, where the directory tree is represented in secondary storage (e.g., disk) by an index file of file headers and a plurality of directory files. The method arranges the file header information for the files and directories of the directory tree into a descriptor tree in primary storage (e.g., memory) corresponding to the directory tree by building directory descriptors corresponding to each of the directory files of the directory tree. The information in these descriptors is retrieved from the file headers by an iterative pass over the index file. The directory descriptors are linked up into a tree corresponding to the directory tree.

Embodiments of the invention may then sue this descriptor tree to gather statistics, or speed access to the files of the directory tree.

Because the method avoids traversing the file headers in a tree-walk order, it executes faster than the prior art methods of traversing the directory tree.

DESCRIPTION OF A PREFERRED EMBODIMENT

The present invention provides a system and method for extracting the relationships between the directories of a volume of a secondary storage device, for example, a disk pack on a disk drive, from the volume's index file without relying on a file by file traversal of the volume's directory tree 500. In accordance with the method described herein, the system provides directory relationships for an entire directory tree while it minimizes I/O operations and also provides a system capable of functions further relating to file management, e.g., gathering statistics relating to the fragmentation of files on a volume. The components of the system and the method by which they operate are described below.

Figure 1:
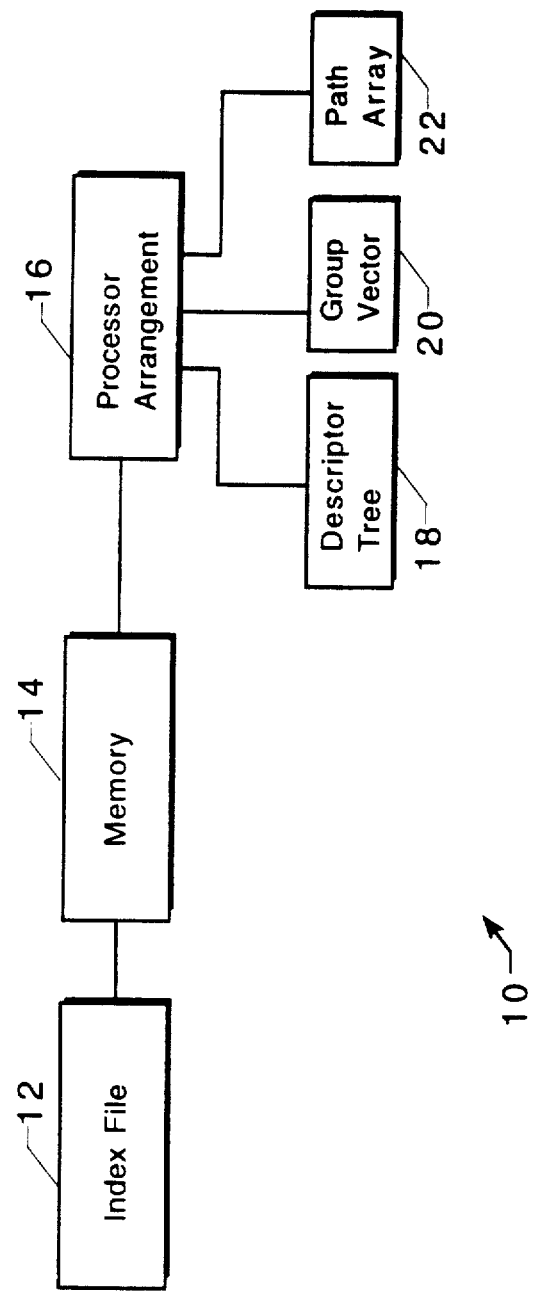
FIG. 1 is a functional block diagram of the components of a system according to the present invention.

Referring to FIG. 1, a system 10 includes an index file 12 containing file headers for all files on a volume, a memory 14 into which the file headers are read, a processor arrangement 16 which gleans from the file headers information to be stored in descriptors, a descriptor tree 18 which stores the descriptors, a group vector 20 which links the descriptors together to represent the relationships between them, and a path array 22 which is used in processing to identify the path followed to reach a descriptor. Further discussion of the above components follows.

During its operation, the system 10 reads file headers from the volume's index file 12 into the memory 14. As this occurs, the processor arrangement 16 iteratively processes the file headers from memory. During each iteration, the processor 16 creates or updates one or more directory descriptors for each file header that represents a directory file, that is for each file header in which a directory flag field is set. Further, the processor arrangement 16 creates or updates a corresponding parent descriptor for each file header that represents a non-directory file, that is a file header in which the directory flag field is clear. Following this, the processor arrangement 16 inserts any newly created descriptors into the descriptor tree 18.

As will become apparent, one advantage of the present invention lies in the use of the descriptor tree 18 to store the descriptors. In using the tree, the present invention avoids having to open, read, and close the actual directory files. The file headers need be read from the index file only once and the necessary directory information is gleaned from them, thus minimizing I/O operations. In addition, in the present invention, the descriptor tree 18 is searchable as a binary tree, a structure known in the art, and is maintained by procedures for binary trees that are also known. However, while the binary search tree is provided to store the descriptors in a manner convenient for searching the tree, it will be appreciated that any other convenient data structure may be used for storing the descriptors.

Referring again to FIG. 1, as the processor arrangement 16 creates and inserts descriptors into the descriptor tree 18, it also links each newly created descriptor with the descriptor that represents its parent through a vector entry in the group vector 20. The group vector 20 contains a number of vector entries, each containing a pointer to the descriptor with which it is associated and a pointer to the next vector entry. In this way, the relationships between directories are extracted and preserved jointly by the descriptor tree 18, and group vector 20. Further file management capabilities provided by the present invention are described below.

In order to provide file management capabilities in connection with providing relationships between directories, the processor arrangement 16, during processing of the file headers, stores selected statistics from each file header, such as, for example, the file size and access activity, in its associated descriptor. After the processor arrangement 16 has processed all of the file headers in the index file, the processor arrangement 16 uses the descriptor tree 18, group vector 20, and path array 22 to gather for example, the selected statistics by performing a reverse post order traversal of the descriptor tree 18 and group vector 20 representation of the directory tree 500. The traversal of the directory tree, an operation which will be described in detail later in connection with FIGS. 4a-4b. Such a file management operation is useful in several areas of volume management, for example, backup operations to achieve higher throughput, operations to monitor directory fragmentation on a volume, or operations to drive a volume defragmentation utility.

The detailed operation of the system 10 in constructing the descriptor tree 18, will now be described with reference first to the record structures shown in FIGS. 2a-2d and then to the flow charts shown in FIG. 3.

Figure 2A:
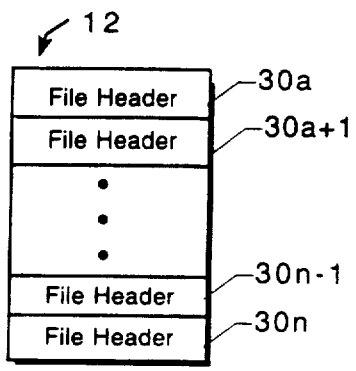
FIGS. 2a, 2b, 2c and 2d are diagrams of the relevant record structures for the index file, file header, descriptors, and group vector used in the system.

Beginning the operation of the system, the processor arrangement 16 reads into memory 14 the index file 12 (or a portion thereof). Referring to FIG. 2a, the index file 12 contains a number of file headers 30a-30n, generally referred to by reference numeral 30. Initially, the processor arrangement 16 will read the first file header 30a. As the system subsequently processes the portion of the index file 12 in memory 14, it reads in more of the index file, and file headers 30, until the entire index file and all of its file headers have been brought into memory and processed. The detailed structure of a file header 30 is shown in FIG. 2b and described below.

Figure 2B:
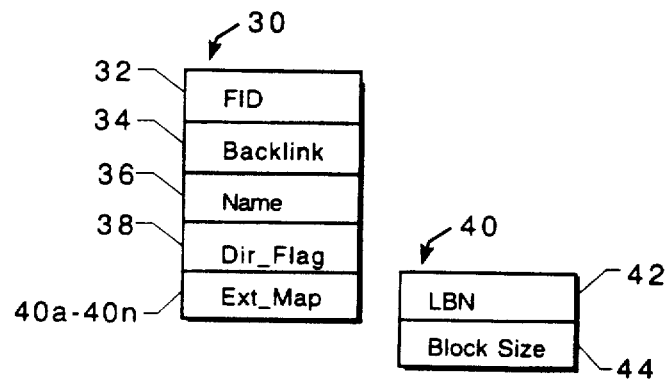

Referring to FIG. 2b, the file header 30 contains several fields including a file identification field (FID) 32, a backlink field 34, a name field 36, a directory flag (dir_flag) field 38, and a series of extent mapping (ext_map) fields 40a-40n, generally referred to by reference numeral 40. The FID field 32 contains a unique identifier for the file in the volume from which the index file 12 was read. The backlink field 34 contains a pointer that identifies the parent directory of the file. The name field 36 contains an alphanumeric identifier by which the file is known to the system. The directory flag 38 indicates whether or not the file defines a directory. Finally, each extent mapping field 40 comprises a logical block number field (LBN) 42 and a block size field 44, which contain the locations of the various portions of the volume containing pieces of the file.

Figure 2C:
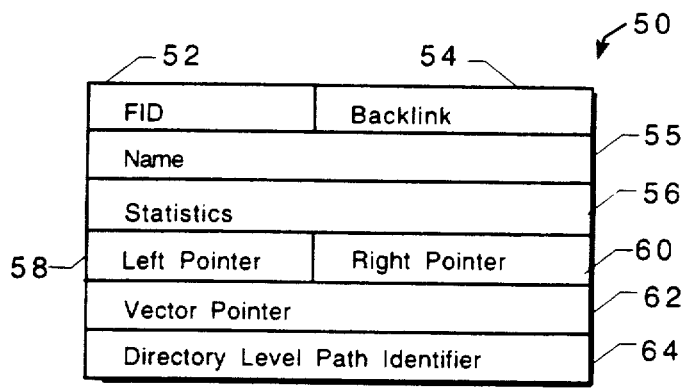

As noted above, the processor arrangement 16 creates or updates one or more directory descriptors for each file header 30 that represents a directory file, that is for each file header in which a directory flag field 38 is set. Further, the processor arrangement 16 creates or updates a corresponding parent descriptor for each file header 30 that represents a non-directory file, that is a file header in which the directory flag field 38 is clear. Referring to FIG. 2c, each descriptor, generally referred to by reference number 50, contains a number of fields including a file identification (FID) field 52, a backlink field 54, a name field 55, a statistics field 56, a left pointer field 58 and right pointer field 60, a vector pointer field 62, and a directory level path identifier field 64. The FID field 52 contains a unique identifier for the file in the volume from which the index file 12 was read. The backlink field 54 contains a pointer that identifies the parent directory of the file. The name field 55 contains an alphanumeric identifier by which the file is known to the system. The contents of the FID field 52, the backlink field 54, and the name field 55 are copied from contents of the FID field 32, backlink field 34, and name field 36 of the file header 30 when the descriptor 50 is created or updated In addition, the statistics field 56 contains various data gathered from the file header 30 concerning, for example, the size of the files contained in the directory, the number of file extents, and so forth. The left pointer field 58 and right pointer field 60 are used to maintain the binary search tree of descriptors sorted and indexed by FID 52. The vector pointer field 62 contains a pointer to a vector entry in the group vector 20 and effectively links the descriptor to other descriptors 50 (i.e., links a descriptor representing a directory to the descriptors representing the directory's subdirectories. Finally, the directory level path identifier 64 uniquely locates a directory within the directory tree 500 (as represented by the descriptor tree 18 and the group vector 20) and can be used in connection with the traversal of the descriptor tree after its creation, an operation described later in connection with FIGS. 4a and 4b.

Figure 2D:
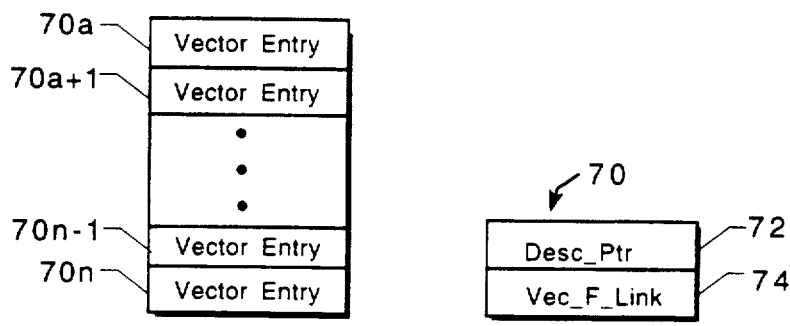

The detailed structure of the group vector 20 and its relation to the descriptors 50 will now be described with reference to FIG. 2d. The group vector 20 contains a number of vector entries 70a-70n, generally referred to by reference number 70. The vector entries 70 serve to link each directory on the volume (represented by one of the descriptors 50 in the descriptor tree 18) to its subdirectories (represented by other of the descriptors 50 in the descriptor tree 18). As noted above, each descriptor 50 has a vector pointer 62 which points to one of the vector entries 70. That is, the vector pointer 62 links the descriptor 50 to a vector entry 70. The vector entry 70 in turn identifies the first of possibly many other descriptors 50, i.e., subdirectories of the directory, in the following way.

Figure 6:
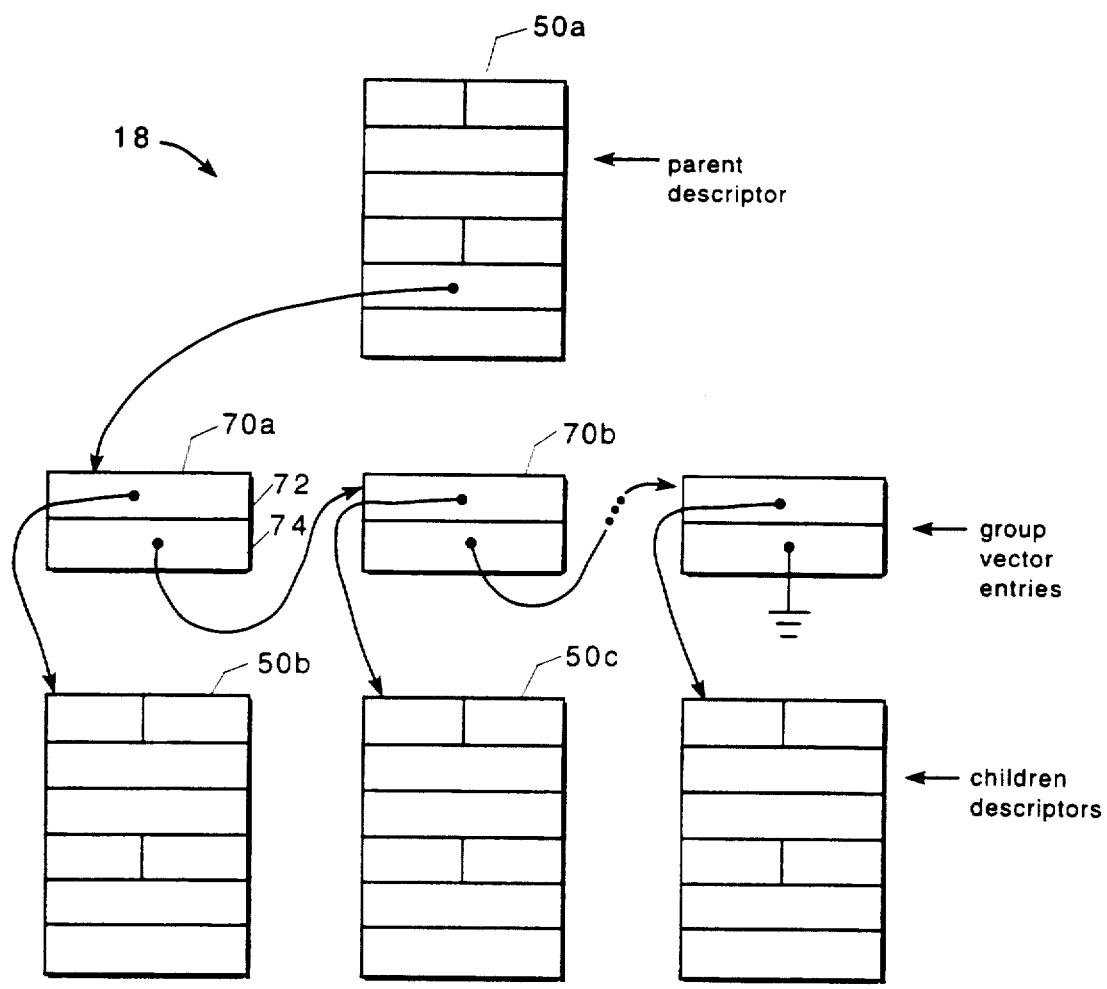
FIG. 6 is a schematic drawing of a portion of a descriptor tree, showing the relationship between a group vector and several directory descriptors.

Each vector entry 70 contains several fields, including a descriptor pointer (desc$_{13}$ ptr) field 72, and a vector forward link (vec_f_link) field 74. To better understand how these fields are used to link the descriptors 50 to one another, consider the portion of an example descriptor tree 18 shown in FIG. 6, in which descriptor 50a represents a directory that has many subdirectories that are also represented by the descriptors 50. Assume that the first of these many subdirectories is represented by a descriptor 50b. Following the contents of the vector pointer field 62 of the descriptor 50a to a first vector entry 70a, the contents of the desc_ptr field 72 of the vector entry 70a point to the descriptor 50b, thus effectively linking the directory (represented by descriptor 50a) to its first subdirectory (represented by descriptor 50b).

Further, the directory represented by the descriptor 50a might have another subdirectory represented by a descriptor 50c. Vector entries 70 are linked to one another through the contents of their vec_f_link fields 74 to form a number of chains of vector entries, one chain for each directory that has subdirectories. Each vector entry in a chain, therefore, identifies a descriptor which represents a subdirectory. Continuing the example from above, if we follow the contents of the vec_f_link field 74 in the vector entry 70a to a vector entry 70b, we find that the contents of the desc_ptr field 72 in the vector entry 70b point to the descriptor 50c. This process can be repeated until the vec_f_link of a vector entry 70 in the chain is null, which indicates that there are no more descriptors linked to the descriptor 50a, i.e., subdirectories of the directory represented by the descriptor 50a. If, on the other hand, the directory represented by the original descriptor in this example (descriptor 50a) has no subdirectories at all, the contents of its vector pointer field 62 are null.

Next, the process of creating and updating the descriptor tree 18 and group vector 20 will be described in detail with reference to FIG. 3.

Figure 3:
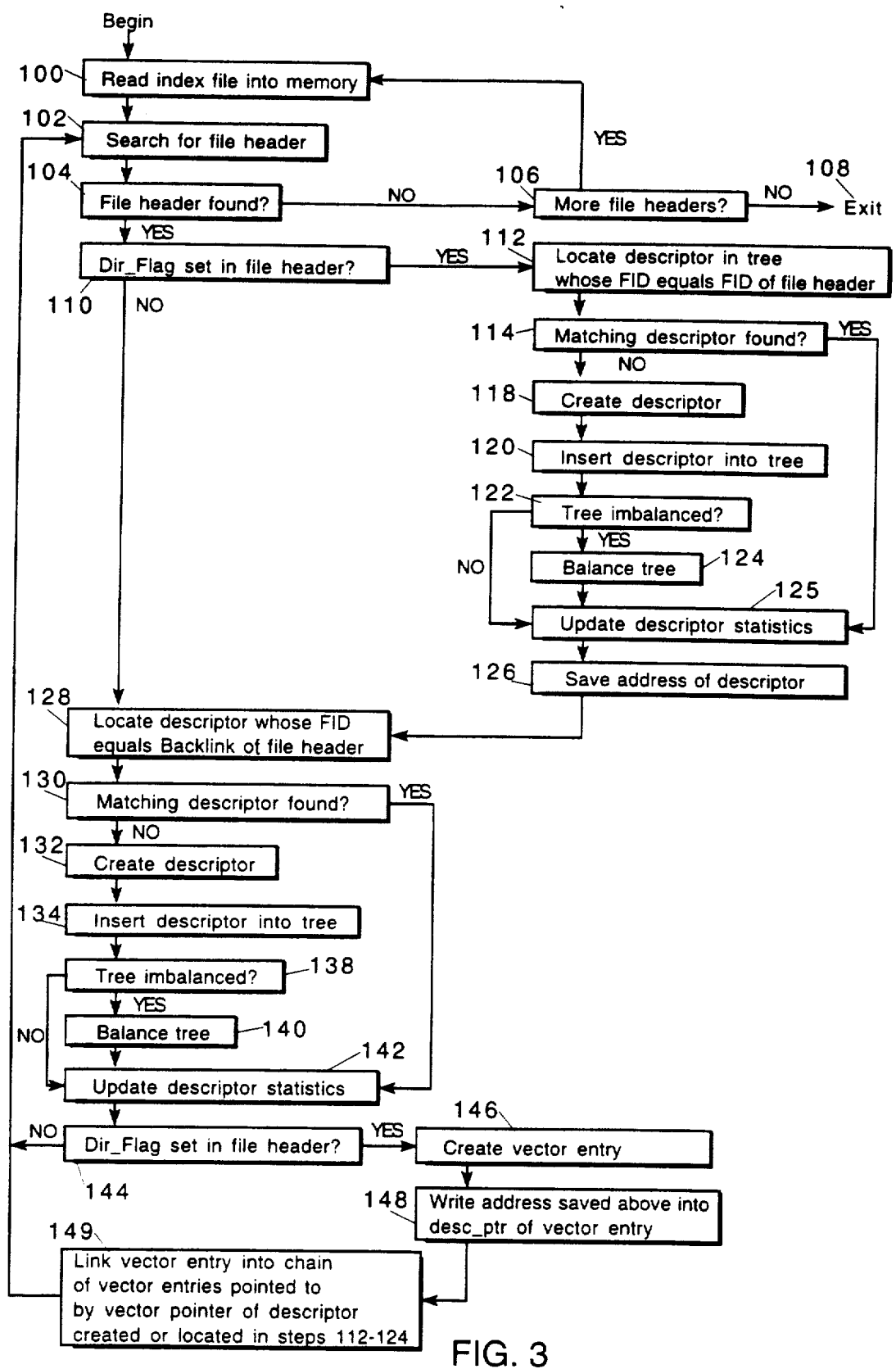
FIGS. 3, 4a, and 4b are diagrams of flowcharts depicting various aspects of the general operation of the system and of relevant record structures.

Referring to FIG. 3, to begin creation of the descriptor tree 18, the processor arrangement 16 reads the index file 12 (or a portion thereof) into the memory 14 (step 100). The processing of each successive file header from the index file 12 is referred to as an iteration. Since the processor may read only a portion of the index file 12 at a time into memory 14, it will continually check for file headers in memory as described below. During each iteration in creating the descriptor tree 18, the processor arrangement 16 searches for the next file header 30 in memory 14 (step 102). If the processor arrangement 16 finds no file headers 30 in memory 14 (step 104), it determines whether there are more file headers in the index file 12 to be read into memory 14 (step 106). If there are more file headers in the index file 12, the processor arrangement 16 returns to step 100 to read another portion of the index file into memory 14. Otherwise, if there are no more file headers 30 in the index file 12, the processor arrangement 16 exits (step 108), as it has completed its creation of the descriptor tree 18. Following step 108, the processor arrangement 16 may use the newly created descriptor tree for other purposes, such as gathering statistics at each directory level for directories at lower levels, as will be described below in connection with FIGS. 4a and 4b.

An overview of the remainder of the steps in FIG. 3 is provided next, followed by a detailed description of the remainder of the steps in FIG. 3. In overview, in step 110, if the processor arrangement 16 determines that the directory flag 38 in the file header 30 is set (that is, the file header represents a directory file), the processor arrangement does two things. First, it locates or creates a descriptor 50 for the directory and fills in the contents of whichever descriptor fields it can from the contents of the file header fields. Second, since the file header may also refer to a parent directory, the processor arrangement 16 locates or creates a descriptor for the parent directory and fills in the contents of whichever descriptor fields it can from the contents of the file header fields. If, on the other hand, the directory flag field 38 of the file header 30 is clear (that is, the file header represents a non-directory file) the processor arrangement 16 need only perform the second operation, that is, locate or create a descriptor for the parent directory and fill in the contents of whichever descriptor fields it can from the contents of the file header fields. Thereafter, if the directory flag 38 in the file header 30 is set, the processor arrangement 16 creates a vector entry 70 for newly created descriptor 50 which represents the first in a chain of vector entries 70 that correspond to the subdirectories of the directory represented by the newly created descriptor. A detailed description of the above steps follows.

Referring again to FIG. 3, if in step 104 the processor arrangement 16 found a file header 30 in memory 14, the processor arrangement next determines if the directory flag 38 in the file header 30 is set (step 110). If so, the file header 30 identifies a directory file and so the processor arrangement 16 determines if a descriptor 50 for the file header has already been created and inserted in the descriptor tree 18. To determine if the file header 30 already has such a descriptor 50, the processor arrangement 16 attempts to locate a descriptor 50 in the binary search tree of descriptors the contents of whose FID field 52 matches the contents of the FID field 32 of the file header 30 (step 112).

If a descriptor 50 having a FID field 52 whose contents match the contents of the FID field 32 of the file header 30 exists (step 114), the processor arrangement 16 updates the contents of the statistics field 56 in the descriptor and copies the contents of the name field 36 and backlink field 34 of the file header 30 into the name field 55 and the backlink field 54 of the descriptor 50 (step 125). Otherwise, if a descriptor 50 whose contents of the FID field 52 match the contents of the FID field 32 of the file header 30 does not exist (step 114), the processor arrangement 16 creates a descriptor 50 for the file header 30 (step 118) and inserts the descriptor 50 into the binary search tree of descriptors according to the contents of its FID field 52 (step 120).

After creating and inserting the descriptor 50, the binary search tree of descriptors may be imbalanced. If the binary search tree of descriptors is imbalanced (step 122), the processor arrangement 16 balances it using known techniques (step 124). Once the binary search tree of descriptors is balanced, or if the binary search tree of descriptors was not imbalanced (step 122), the processor arrangement 16 updates the descriptor data contained in the statistics field 56 of the descriptor 50 (step 125) and saves the address of the descriptor (step 126) and proceeds to step 128.

Returning to step ling 110, if the directory flag 38 in the file header 30 is clear, that is, the file header identifies a non-directory file, the processor arrangement 16 locates or creates a descriptor 50 that represents the parent directory of the non-directory file. To do this, the processor arrangement 16 locates a descriptor 50 in the binary search tree of descriptors the contents of whose FID field 52 match the contents of the backlink field 34 of the file header 30 (step 128).

If a descriptor 50 the contents of whose FID field 52 match the contents of the backlink field 34 of the file header 30 exists (step 130), the processor arrangement 16 updates the contents of the statistics field 56 in the descriptor (step 134). Otherwise, if a descriptor 50 the contents of whose FID field 52 match the contents of the backlink field 34 of the file header 30 does not exist (step 130), the processor arrangement 16 creates a descriptor 50 for the file header 30 (step 132) and inserts the descriptor 50 into the binary search tree of descriptors according to the contents of its FID field 52 (step 134).

After creating and inserting the descriptor 50, the binary search tree of descriptors can be imbalanced. If the binary search tree of descriptors is imbalanced (step 138), the processor arrangement 16 rebalances it using known techniques (step 140). Following step 140, or following step 130, the processor arrangement 16 updates the descriptor data contained in the statistics field 56 of the descriptor (step 142).

Following step 142, the processor arrangement 16 again determines if the directory flag 38 is set in the file header 30. If the directory flag 38 is not set (step 144), that is, if the file header 30 identifies a non-directory file, the processor arrangement 16 returns to step 102 to process the next file header 30. Otherwise, if the directory flag 42 is set (step 144), the processor arrangement 16 creates a group vector entry 70 (step 146) and links the vector entry 70 to the chain of vector entries pointed to by the vector pointer 62 in the descriptor 50 that was located in step 128.

In order to link the descriptor 50 that was created or updated in steps 112-125 to its parent descriptor 50 that was located in steps 128-142, and ultimately to create the subdirectory relationships in the descriptor tree 18, the processor arrangement 16 first writes the address of the child descriptor 50, which was located or created in steps 112-125 and whose address was saved in step 126, into the desc_ptr field 72 of the newly created vector entry 70 (step 148). The use of the group vector 20 allows the processor arrangement 16 to later find the descriptor 50 for the subdirectory of a directory as in a conventional directory tree traversal, but much more quickly than can be accomplished in a conventional directory tree traversal. Next, as described in detail below, the processor arrangement 16 links the newly created vector entry 70 to the chain of vector entries pointed to by the contents of the vector pointer field 62 of the parent descriptor 50.

In order to completely identify the relationships between the descriptors 50 of the descriptor tree 18, that is, a chain of pointers from the vector pointer 62 of the descriptor for the root of the descriptor tree 18 through the vector entries 70 down to the descriptor for the lowest subdirectory, the processor arrangement 16 inserts the newly created vector entry 70 into the chain of vector entries pointed to by the contents of the vector pointer field 62 of the parent descriptor 50 (step 149).

There are two basic cases to consider when inserting entries in the chain. In the first case, there are no entries in the chain. In that case, to complete the vector operations, the processor arrangement 16 sets the contents of the vector pointer field 62 in the parent descriptor 50 to point to the newly created vector entry 70. In the second case, there are entries in the chain. In that case, the processor arrangement 16 walks the chain, following the contents of the vec_f_link field 74 in each vector entry 70 to the next vector entry, until finding a position for the vector entry, and inserting it in that position. In the system depicted in FIG. 1, the processor arrangement 16 positions a vector entry 70 in the chain according to the contents of the name field 55 in its associated descriptor 50, so that the entries of the chain are ordered in reverse alphabetical order. Alternatively, new entries can be arbitrarily inserted at the beginning or end of the chain. Following step 149, in which the newly created vector entry 70 is linked to the chain of vector entries for the newly created or update descriptor 50, the processor arrangement 16 returns to step 102 to process another file header 30. The processor arrangement 16 repeats this process until all file headers 30 have been processed and the creation of the descriptor tree 18 and group vector 20 is complete.

Next, an example of how the descriptor tree 18 and group vector 20 can be used to gather statistics stored in the descriptors 50 is described.

To gather the statistics stored in the descriptors 50 of the descriptor tree 18, the processor arrangement 16 performs a reverse post order traversal of the descriptor tree 18. In general, a reverse post order traversal involves processing each node of a tree, in this case, each descriptor 50 of the descriptor tree 18. To better understand the process of traversing a tree, it is helpful to think of walking around the outside of the tree, starting at the root, moving clockwise, and staying as close to the tree as possible. For a reverse post order traversal, each node of the tree is processed the last time it is passed. Therefore, in the case of traversing the descriptor tree 18, the processor arrangement 16 begins at the descriptor 50 which is at the root of the descriptor tree 18. Following the left and right pointers 58 and 60 of the descriptor 50 which lead to the children of the descriptor 50, the processor arrangement 16, traverses from one node of the descriptor tree 18 to the next until it reaches a descriptor 50 that it will not pass again, e.g., a leaf node. When the processor arrangement 16 reaches such a descriptor 50, it reads the statistics from the descriptor, possibly storing them on a stack for future use, and copies the contents of the path array 22 into the directory level path identifier field 64 of the descriptor 50 being processed. Following these stacking and storing operations, the processor arrangement 16 continues the traversal and processes each successive node of the descriptor tree 18 on the last pass, until finally reaching the root node again which it processes last. A detailed description of how the processor arrangement 16 uses the group vector 20 and the path array 22 in particular to accomplish the reverse post order traversal and gathering of statistics follows.

Figure 4A:
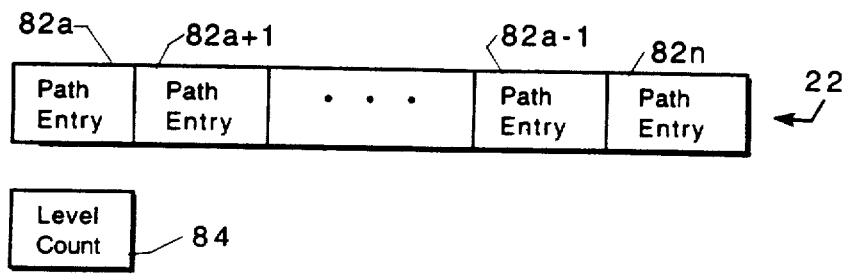

After processing the entire index file 12, the processor arrangement 16 may perform a reverse post order traversal on the descriptor tree 18. Referring to FIG. 4a, the path array 22, contains a number of path entries 82a–82n, where n is the number of directory levels supported by the particular computer system. For example, the VMS operating system supports eight levels of directories. Further, a directory level count 84 indicates how many levels the traversal has descended and serves as an index into the path array 22. The contents of the path array 22 uniquely identify the directory path taken to reach a descriptor and are, at each descriptor 50 visited during the traversal, copied into the directory level path identifier field 64 of the descriptor. At any point in the traversal, then, the processor arrangement 16 can reference the contents of the path identifier field 64 of a descriptor 50 to identify the directory path taken to reach the descriptor. This operation and the operation of the traversal in general is described in detail below in connection with FIG. 4b.

Figure 4B:
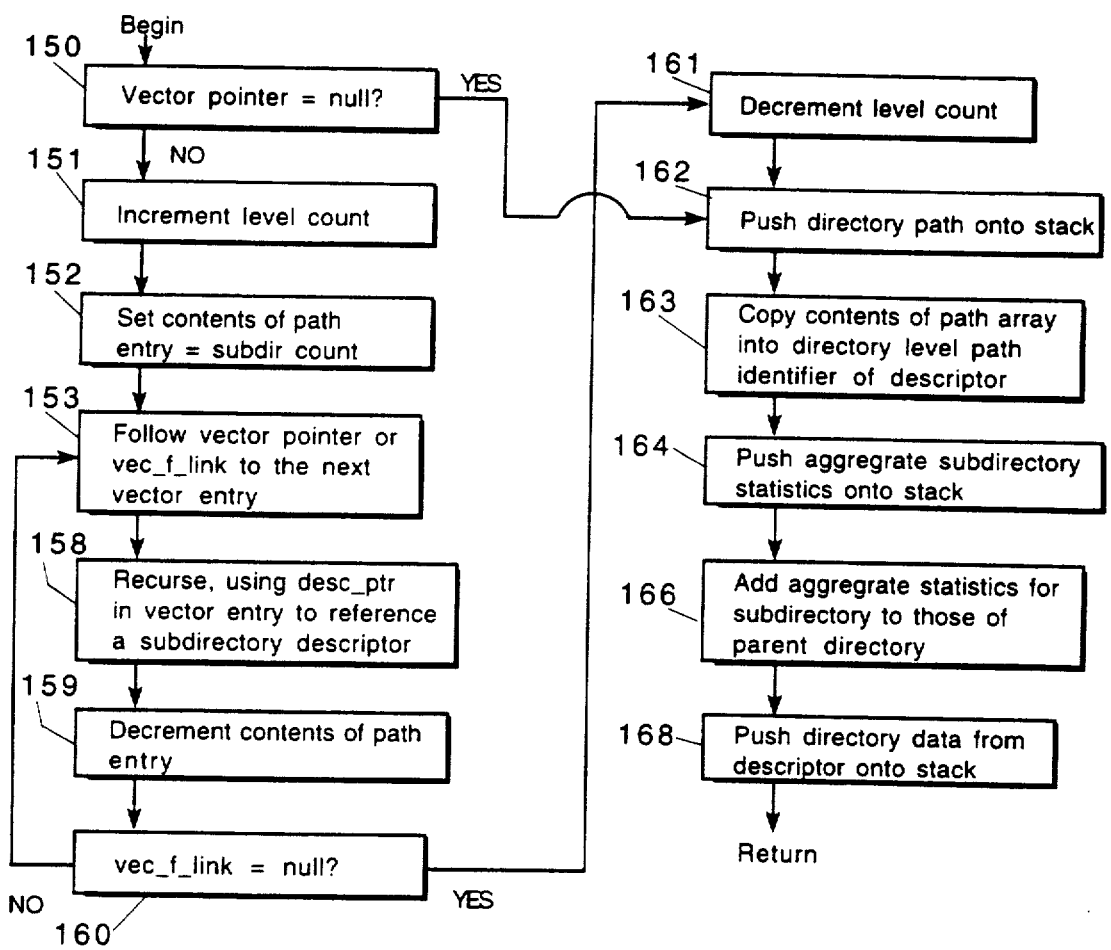
Figure 5:
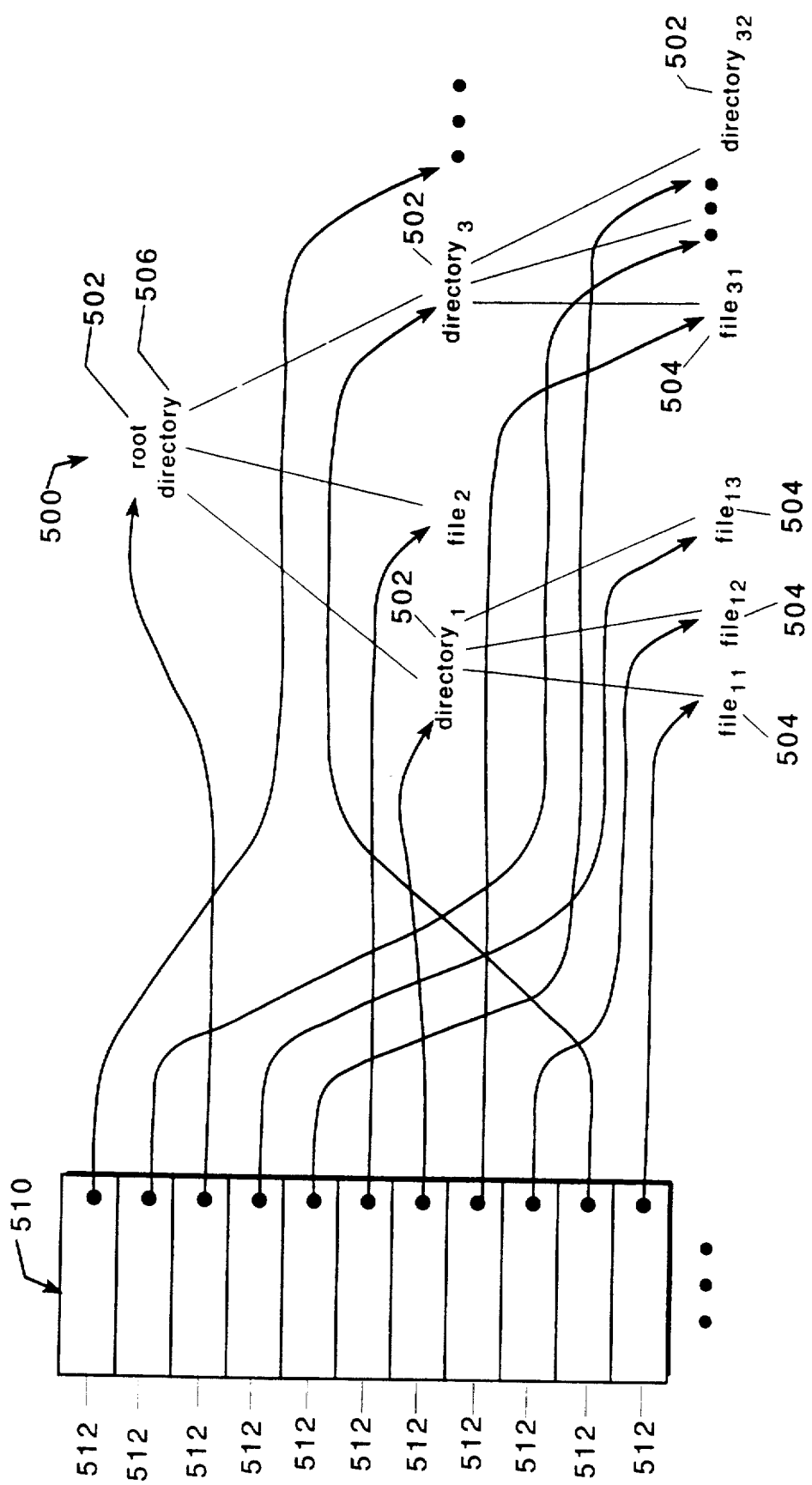
FIG. 5 is a schematic drawing of a directory tree with several directory files, and an index file with several file headers.

Referring to FIG. 4b, the processor arrangement 16 begins a recursive process beginning with the descriptor 50 for the root of the descriptor tree 18 (or a subtree thereof). If the vector pointer 62 of the descriptor 50 is not null (step 150), that is, if there are descriptors associated with the root descriptor, the processor arrangement 16 increments the level count 84 (step 151). The processor arrangement 16 then sets the contents of the path entry 82 in the path array 22 as indexed by the level count 84 equal to the contents of a subdirectory count maintained in the statistics field 56 of the descriptor 50. Following the vector pointer 62 in the descriptor 50, the processor arrangement 16 locates the first vector entry 70 (step 153).

Next, in order to eventually reach a leaf of the descriptor tree 18, and thus accumulate statistics along a complete directory path, i.e., from the root of the tree to a leaf, the processor arrangement 16 makes a recursive call to step 150, using the contents of the desc_ptr field 72 of the vector entry 70 to reference a subdirectory descriptor 50 (step 158), that is, to find the next child descriptor.

Upon completing the recursive calls begun in step 58, which allowed the processor arrangement 16 to identify all of the nodes in the subtree, the processor arrangement 16 decrements the contents of the path entry 82 in path array 22 as indexed by the level count 84 (step 159). At this point, if the vec_f_link 74 of the current vector entry 70 is not null (step 160), the processor 16 returns to step 153 and continues processing the recursive calls until it reaches the end of the chain of vector entries 70. If, on the other hand, the vec_f_link 74 of the current vector entry 70 is null (step 160), the processor arrangement 16 decrements the level count 84 (step 161).

At step 162, either all subdirectories of the descriptor 50 have been processed (steps 151-161) or there were no subdirectories, as indicated by the null vector pointer 62 in the descriptor 50 (step 150). Continuing at step 162, the processor arrangement 16 pushes the directory path onto a stack (step 162). The contents of the path array 22 identify the unique location of the descriptor 50 in the descriptor tree 18, and thereby the corresponding directory in the directory tree 500. Therefore, the processor arrangement 16 copies the contents of the path array 22 into the directory level path identifier field 64 of the descriptor 50 (step 163).

Following step 163, the processor arrangement 16 pushes the aggregate subdirectory statistics, that is, the statistics gathered from each recursive descent into the subtree rooted by the current descriptor 50, onto the stack (step 164). Next, the processor arrangement 16, adds the aggregate subdirectory statistics to those accumulated so far for the parent descriptor of the current descriptor 50 (step 166). Finally, the processor arrangement 16 pushes directory data from the current descriptor 50 onto the stack (step 168).

Having completed the gathering of statistics for the directory path, the processor arrangement 16 returns to process the prior level of recursion. This process repeats until all levels of recursion are exhausted, i.e., until all subdirectories are processed and the processor arrangement 16 again visits the root node of the descriptor tree 18. The processor arrangement 16 then processes the root node to complete the reverse post order traversal and gathering of statistics.

In summary, the present invention provides a system and method of extracting the relationships between directories that does not rely on a file by file traversal of the volume's directory tree. As described herein, the system provides directory relationships in a way which minimizes I/O operations and also provides functions further relating to file management, e.g., gathering statistics relating to the fragmentation of files on a volume.

While the above description is limited to a specific embodiment of the present invention, it will be apparent, however, that variations and modifications may be made to the invention with the attainment of some or all of the advantages of the invention. Therefore, it is the object of the following claims to cover all such variations and modifications as come within the true spirit and scope of the invention.

What is claimed is:

1. In a digital data processing arrangement comprising a primary storage and a secondary storage, said secondary storage comprising a directory tree, said directory tree defined by a plurality of directory files together with an index file, said index file comprising a plurality of file headers sequentially arranged in said index file, each said directory file corresponding to one of said file headers, said headers containing data indicating an attribute of the corresponding directory files, a method for building a descriptor tree in said primary storage corresponding to said directory tree, the method comprising the steps:
    building in said primary storage a set of directory descriptors, each said descriptor corresponding to one of said directory files and to the corresponding file header, each said descriptor comprising information describing an attribute of the corresponding directory file, by iteratively retrieving said file headers from said index file substantially in the sequential order in which said file headers are arranged in the index file; and
    arranging said descriptors into said descriptor tree corresponding to said directory tree by examining tree structure information retrieved from said secondary storage to determine parent/child pairs of said file headers and establishing corresponding tree structure links between the descriptors corresponding to the members of said parent/child pairs;
    wherein said building and said arranging steps are accomplished by retrieving each said file header from said secondary storage exactly once, and without traversing said file headers in a tree-walk order.

2. The method of claim 1, wherein said descriptors are built substantially in an order corresponding to said order of said file headers, and wherein each of said file headers comprise a pointer to a parent file header, said parent file header being one of said plurality of file headers, the arranging step further comprising the step:
    searching for one of said descriptors, a search key of said searching comprising a value of said pointer.

3. The method of claim 1 wherein each of said descriptors in said descriptor tree may have one or more children, each of said children being one of said descriptors, each of said descriptors comprising a datum, wherein the data of the children of a parent descriptor are ordered with respect to each other, and said children are accessed from said parent descriptor according to said order.

4. The method of claim 1 wherein said each of said descriptors in said descriptor tree may have one or more children, each of said children being one of said descriptors, wherein the children of a parent descriptor are associated with said parent descriptor by means of a group vector, said group vector being a linked list of vector entry data structures, each of said vector entry data structures comprising a pointer to one of said children and a pointer, possibly null, to a successor vector entry data structure.

5. The method of claim 1, wherein said descriptors in said descriptor tree belong to one of a plurality of levels, each of said descriptors may have one or more children, each of said children being one of said descriptors and having said descriptor as a parent, an ancestor of a node being either a parent of said node or a parent of an ancestor of said node, wherein a descriptor's location within said descriptor tree is represented as a numeric path identifier, the method further comprising the steps:
    A. for each of said descriptors, ordering said children of said descriptor into an order, whereby each of said children is assigned a numeric value in sequence according to said order,
    B. naming each of said nodes by a numeric path identifier, said path identifier comprising an array of entries corresponding to said levels of said descriptor tree and having a numeric value:
        1. in the entry corresponding to the level of said node, the numeric value assigned to said node; and
        2. for each ancestor of said node, in the entry corresponding to the level of said ancestor, the numeric value assigned to said ancestor.

6. The method of claim 1 wherein said directory descriptors each comprise a field for a statistic describing a property of the corresponding file header or file, the method further comprising the steps:
    initializing, without human intervention, a first statistic field of a first one of said descriptors with information describing a directory file corresponding to said first descriptor;
    traversing said descriptor tree in a tree-walk order after both said building steps and said arranging steps have been completed; and
    during said traversing, deriving a value of the statistic field of a second one of said descriptors as a function of said first statistic.

7. The method of claim 6 wherein said first statistic is obtained from the file header or directory file corresponding to said first descriptor.

8. The method of claim 1, wherein
    memory for a first descriptor corresponding to a first of said file headers, said first file header not yet iteratively retrieved, is allocated in response to said iterative retrieval of a second file header and stored in a manner that allows said first descriptor to be searched for and found subsequently; and
    when said iterative retrieval subsequently retrieves said first file header, said building step further comprises the step of searching for and finding said first descriptor and completing said first descriptor's description of the corresponding directory file.

9. The method of claim 8 wherein each of said file headers comprise a pointer to a parent file header, said parent file header being one of said plurality of file headers, and wherein the finding and arranging steps use said parent pointer to arrange said descriptors into said descriptor tree.

10. The method of claim 8 wherein
said storing step comprises storing said first descriptor into a binary tree substantially as memory for said first descriptor is allocated; and
said searching step comprises searching said binary tree, said binary tree comprising said descriptors as nodes and edges distinct from the edges of said descriptor tree.

11. The method of claim 10 wherein said binary tree is a balanced binary tree, said binary tree being rebalanced substantially as each descriptor is arranged into said binary tree.

12. The method of claim 1, wherein memory for said descriptors is allocated in an order determined by the order of said file headers in said index file, thereby building said descriptor tree in parts initially disconnected, wherein said arranging step further comprises the step of finding descriptors of said disconnected parts and linking them together into said descriptor tree.

13. The method of claim 12 wherein each of said file headers comprise a pointer to a parent file header, said parent file header being one of said plurality of file headers, and wherein the finding and arranging steps use said parent pointer to arrange said descriptors into said descriptor tree.

14. The method of claim 12 wherein said finding step comprises searching a binary tree, said binary tree comprising said descriptors as nodes and edges distinct from the edges of said descriptor tree, and each said descriptor is arranged into said binary tree substantially as memory for said descriptor is allocated.

15. The method of claim 14 wherein said binary tree is a balanced binary tree, said binary tree being rebalanced as each descriptor is arranged into said binary tree.

16. In a digital data processing arrangement comprising a primary storage and a secondary storage, said secondary storage comprising a directory tree defined by a plurality of directory files together with an index file comprising a plurality of file headers sequentially arranged in said index file, each said directory file corresponding to one of said file headers, said headers containing data indicating an attribute of the corresponding directory files, wherein each of said file headers or directory files comprise a pointer indicating a parent file and corresponding header, each of said parent files and headers being one of said plurality of said directory files and file headers, said parent pointer having a value, a method for building a descriptor tree in said primary storage corresponding to said directory tree, the method comprising the steps:
building in said primary storage a set of directory descriptors, each said descriptor corresponding to one of said directory files and to the corresponding file header, each said descriptor comprising information describing an attribute of the corresponding directory file, by iteratively retrieving said file headers from said index file substantially in the sequential order in which said file headers are arranged in the index file, wherein the descriptors of said descriptor tree are built substantially in an order corresponding to an order of said file headers in said index file, thereby building said descriptor tree in multiple disconnected parts;
linking a descriptor built in response to said retrieving into a binary tree, said binary tree comprising said descriptors as nodes and edges distinct from the edges of said descriptor tree; and
arranging said descriptors into said descriptor tree corresponding to said directory tree by examining tree structure information retrieved from said secondary storage to determine parent/child pairs of said file headers and establishing corresponding tree structure links between the descriptors corresponding to the members of said parent/child pairs;
wherein said building and said arranging steps are accomplished by retrieving each said file header from said secondary storage exactly once, and without traversing said file headers in a tree-walk order.

17. The method of claim 16 wherein said directory descriptors each comprise a field for a statistic describing a property of the corresponding file header or file, the method further comprising the steps:
initializing a first statistic field of a first one of said descriptors with information obtained from the file header or directory corresponding to said first descriptor;
traversing said descriptor tree in a tree-walk order after both said building steps and said arranging steps have been completed; and
during said traversing, deriving a value of the statistic field of a second one of said descriptors as a function of said first statistic.

18. The method of claim 16, wherein said descriptors belong to one of a plurality of levels, each of said descriptors may have one or more children, each of said children being one of said descriptors and having said descriptor as a parent, an ancestor of a node being either a parent of said node or a parent of an ancestor of said node, wherein a descriptor's location within said descriptor tree is represented as a numeric path identifier, the method further comprising the steps:
A. for each of said descriptors, ordering said children of said descriptor into an order whereby each of said children is assigned a numeric value in sequence according to said order,
B. naming each of said nodes by and storing in the descriptor corresponding to the node a numeric path identifier, said path identifier comprising an array of entries corresponding to said levels of said descriptor tree and having a numeric value:
1. in the entry corresponding to the level of said node, the numeric value assigned to said node; and
2. for each ancestor of said node, in the entry corresponding to the level of said ancestor, the numeric value assigned to said ancestor.

* * * * *